Patented June 23, 1942

2,287,758

UNITED STATES PATENT OFFICE 2,287,758

PROCESS FOR THE PRODUCTION OF DICALCIUM PHOSPHATE

Edward J. Fox, Washington, D. C.

No Drawing. Application January 14, 1941, Serial No. 374,357

4 Claims. (Cl. 23—108)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This is a continuation in part of my pending application for patent, Serial No. 299,724, filed October 16, 1939.

In United States Patent No. 2,143,438, dated January 10, 1939, I have described a process for the production of monocalcium chlorophosphate, $CaClH_2PO_4.H_2O$, which process comprises treating phosphate rock with hydrochloric acid, adding thereto sufficient phosphoric acid, or monocalcium phosphate, to convert all of the lime present in the mixture into the said monocalcium chlorophosphate, and drying the product. This salt is an excellent fertilizer material where relatively high concentrations of chlorides are not objectionable, but is not suitable where relatively low concentrations are required.

The invention herein described and claimed relates to the removal of the chlorine contained in monocalcium chlorophosphate as a mixture of hydrochloric acid gas and water vapor and the production of a solid residue substantially free from chlorides, consisting mostly of dicalcium orthophosphate, suitable for fertilizer and other purposes.

Compared with superphosphate manufacture, the production of dicalcium phosphate for fertilizer purposes, by the conventional method of dissolving phosphate rock in hydrochloric acid and precipitating the phosphate with milk-of-lime, is uneconomical of reagent materials. It consumes not only forty percent more reagent acid than the superphosphate method of producing available phosphate, but also requires calcium hydroxide equivalent to the dicalcium phosphate produced.

In my process, the use of milk-of-lime is eliminated and the acid consumed in the production of dicalcium phosphate is reduced to about sixty percent of that required for the manufacture of superphosphate. This economy is illustrated in the following equations, showing the reagents consumed in these processes by phosphate rock containing the usual approximate ratio of seven moles of CaO to two of $P_2O_5$:

1. $7CaO.2P_2O_{5(s)}+5H_2SO_{4(l)}=2CaH_4P_2O_{8(s)}+5CaSO_{4(s)}+H_2O$

2. $7CaO.2P_2O_{5(s)}+14HCl_l+4Ca(OH)_{2(l)}=$
   $4CaHPO_{4(s)}+7CaCl_{2(l)}+9H_2O$

3. $7CaO.2P_2O_{5(s)}+3H_2SO_{4(l)}=4CaHPO_{4(s)}+3CaSO_{4(s)}+H_2O$

Furthermore, the concentration of available phosphate in the product of my invention is greater than that in ordinary superphosphate and is about equal to that in treble superphosphate, a factor which materially reduces transportation costs per unit of plant food.

An additional feature of my invention is the production of the said dicalcium phosphate in granular form, which form greatly improves the drillability of the product over that precipitated in powdered form.

I have found that phosphate rock dissolved in hydrochloric acid yields a solution of calcium chloride and phosphoric acid. On concentrating this solution, monocalcium chlorophosphate is precipitated until a solution saturated with respect to calcium chloride alone remains. A separation of the solid and liquid phases at this point, however, is not feasible because of their physical properties.

Evaporating the above mixture to dryness and heating it to drive off hydrochloric acid results in a further reaction between the monocalcium chlorophosphate and the residue of calcium chloride, yielding, as a solid product, tricalcium chlorophosphate, or chlorspodiosite, $Ca_3P_2O_8.CaCl_2$, in which form the phosphate is unavailable as plant food. It is necessary, therefore, to adopt some means, such as I have described in the above-mentioned patent, to obtain the monocalcium chlorophosphate substantially free from calcium chloride. Accordingly, the production of this salt is herein regarded as a preliminary step in the production of dicalcium phosphate by my process, although, in practice, a break in the operation at this point may not be necessary. A further description will be hereinafter given of that portion of the process dealing solely with the conversion of monocalcium chlorophosphate into dicalcium phosphate, hydrochloric acid, and water vapor and the recovery of these products.

I have found that a simple thermal treatment does not convert monocalcium chlorophosphate into dicalcium orthophosphate. When heated, monocalcium chlorophosphate decomposes in two steps, the first of which yields one mole of hydrogen chloride and two moles of water vapor from two moles of monocalcium chlorophosphate, leaving a solid residue which still retains one mole of chlorine per mole of $P_2O_5$. The extent of this reaction may be approximately represented as follows:

4.

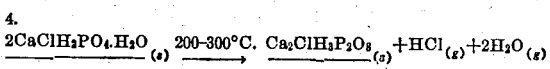

On heating to higher temperatures the solid residue is converted to calcium pyrophosphate with the release of the remaining chlorine and hydrogen in the form of hydrochloric acid and water vapor.

5.

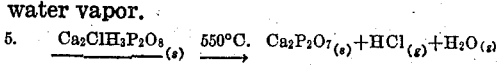

The calcium pyrophosphate thus produced is also non-available as plant food.

However, if steam is passed through the charge while the temperature is maintained in the range 200–300° C., monocalcium chlorophosphate is converted to solid dicalcium orthophosphate, hydrogen chloride and water vapor.

6. 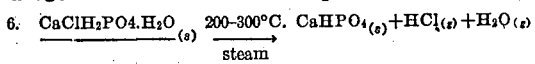

The temperature required for this reaction is not critical and the conversion may be made at any temperature above the condensation point of the resulting gas mixture, ca. 125° C., and below the decomposition point of dicalcium orthophosphate, ca. 550° C.

The rate of reaction is a function of the temperature and the partial pressure of water vapor in contact with the charge. Increasing the temperature from 150° C. to 300° C. approximately doubles the rate of reaction. At the latter temperature the conversion is about 95 percent complete in 30 minutes with just sufficient water vapor to sweep the gaseous products from the charge.

The maximum concentration of hydrochloric acid in the gas phase obtainable without decomposing the dicalcium orthophosphate is indicated by reaction 4 and is approximately 33 mol per cent, or about 50 per cent by weight, a concentration too great to be completely condensed to the liquid phase at ordinary temperature and pressure.

In the operation of this process, I have found it advantageous to charge the reaction chamber with uniformly sized particles, or with a macadamized bed, of solid monocalcium chlorophosphate, which arrangement affords a maximum of interstitial space for the free passage of steam and the escape of the gaseous products of reaction. The particles so charged remain unchanged in size or shape and the dicalcium phosphate thus obtained is in granular form admirably adapted for use in modern fertilizer drills. The process, however, is not limited to this procedure, but may be carried out with uniform or heterogeneously mixed particles of various sizes in any suitable type of vessel or container.

Examples of the results obtained by the operation of the above described process are given below. Two types of material were employed: (A) a chemically pure form of monocalcium chlorophosphate prepared from C. P. reagents; and (B) a crude form, derived from phosphate rock and technical grades of phosphoric and hydrochloric acids. Sample A was heated 75 minutes in the presence of steam to 250° C., B, 120 minutes to 200° C. only. The hydrochloric acid generated was recovered by condensation and absorption and found to be in substantial agreement with the loss of chlorine from the charge.

*Analyses of solids*

|  | Charge: $CaClH_2PO_4 \cdot H_2O$ | | Product: $CaHPO_4$ | |
| --- | --- | --- | --- | --- |
|  | A. Pure | B. Crude | A. Pure | B. Crude |
| Weight _____ grams __ | 50.0 | 50.0 | 35.7 | 37.5 |
| $P_2O_5$, total ____ percent __ | 37.25 | 34.89 | 51.78 | 46.11 |
| $P_2O_5$, avail.[1] _____ do ____ | 37.25 | 34.38 | 51.78 | 44.86 |
| $CaO$ _____ do ____ | 29.31 | 27.22 | 41.37 | 36.60 |
| Cl _____ do ____ | 18.41 | 15.03 | 0.11 | 0.23 |
| F _____ do ____ |  | 1.89 |  | 2.03 |
| $SiO_2$, etc.[2] _____ do ____ |  | 5.33 |  | 7.72 |

[1] Soluble in water and/or neutral ammonium citrate solution.
[2] Insoluble in dilute nitric acid solution.

Having thus described my invention, I claim:

1. The process for producing dicalcium orthophosphate comprising heating monocalcium chlorophosphate, substantially free of calcium chloride, in an atmosphere of steam, until decomposition to hydrochloric acid gas and solid dicalcium orthophosphate is substantially complete, removing the hydrochloric acid gas and recovering the dicalcium orthophosphate.

2. The process for producing dicalcium orthophosphate comprising heating monocalcium chlorophosphate, substantially free of calcium chloride, in an atmosphere of steam, at a temperature below the decomposition point of dicalcium orthophosphate and above the vapor condensation point of steam, until decomposition to hydrochloric acid gas and solid dicalcium orthophosphate is substantially complete, removing the hydrochloric acid gas and recovering the dicalcium orthophosphate.

3. The process for producing dicalcium orthophosphate comprising heating, at a temperature of about 125–400° C., monocalcium chlorophosphate, substantially free of calcium chloride, in an atmosphere of steam, until decomposition to hydrochloric acid gas and solid dicalcium orthophosphate is substantially complete, removing the hydrochloric acid gas and recovering the dicalcium orthophosphate.

4. The process for producing dicalcium orthophosphate comprising heating monocalcium chlorophosphate, substantially free of calcium chloride, in the presence of steam, in amounts sufficient substantially to prevent the formation of calcium pyrophosphate and to support decomposition of the monocalcium chlorophosphate to hydrochloric acid gas and solid dicalcium orthophosphate, removing the hydrochloric acid gas, and recovering the dicalcium orthophosphate.

EDWARD J. FOX.